Figure 1:
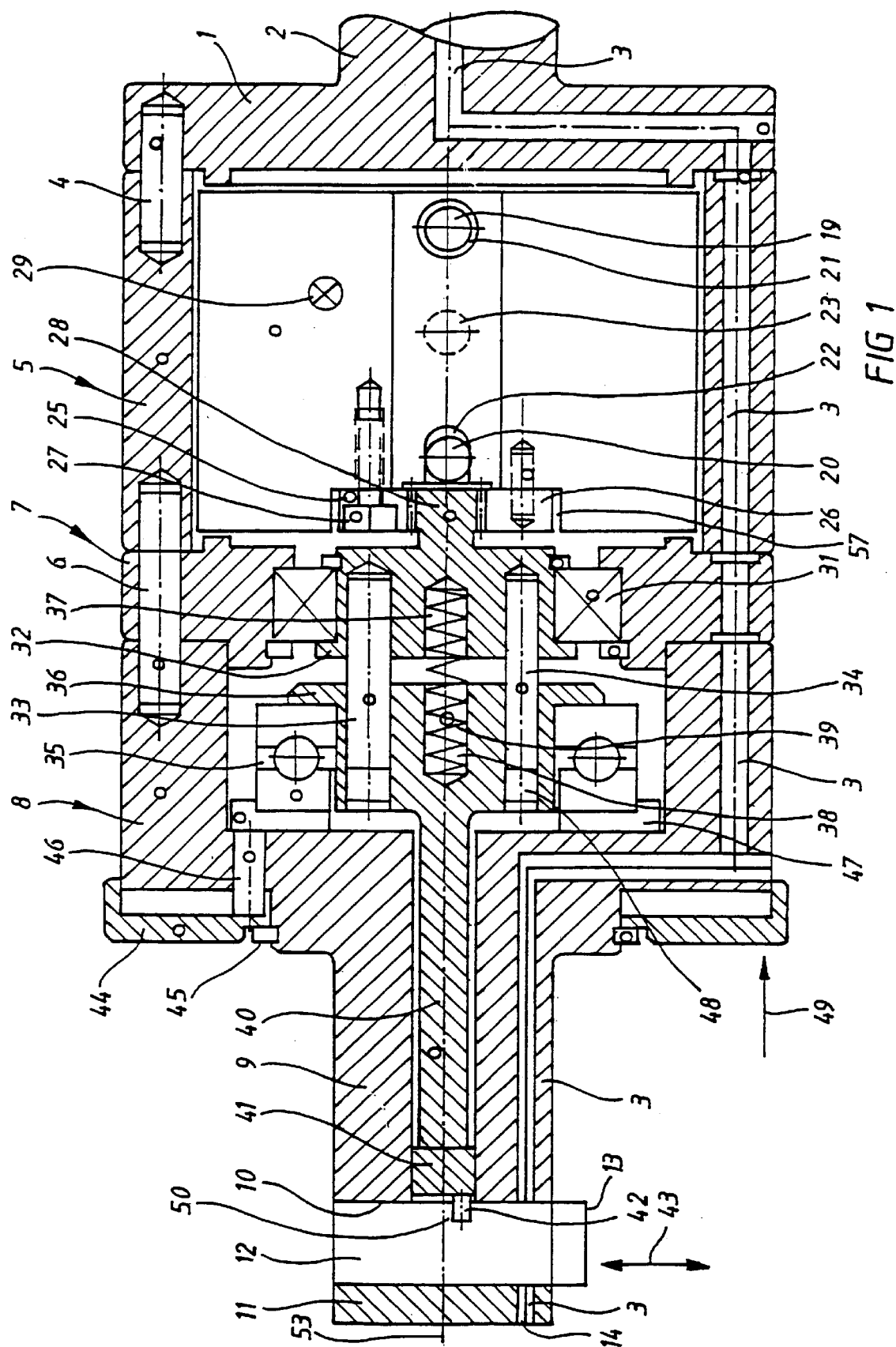

United States Patent [19]
Heule et al.

[11] Patent Number: 6,033,160
[45] Date of Patent: Mar. 7, 2000

[54] CENTRIFUGALLY CONTROLLED COUNTERSINKING AND DEBURRING TOOL

[75] Inventors: Heinrich Heule, Au/SG; Werner Lippuner, Balgach, both of Switzerland

[73] Assignee: Ulf Heule, Balgach, Switzerland

[21] Appl. No.: 09/150,432

[22] Filed: Sep. 9, 1998

[30] Foreign Application Priority Data

Sep. 10, 1997 [DE] Germany .......................... 197 39 621

[51] Int. Cl.[7] .................................................. B23B 51/00
[52] U.S. Cl. .......................................... 408/178; 408/153
[58] Field of Search ............................. 408/93, 152, 153, 408/173, 178

[56] References Cited

U.S. PATENT DOCUMENTS

| | | | |
|---|---|---|---|
| 4,162,867 | 7/1979 | Calcaterra et al. ..................... | 408/178 |
| 4,660,262 | 4/1987 | Heule ........................................ | 408/93 |
| 4,756,649 | 7/1988 | Heule ..................................... | 408/178 |
| 5,209,617 | 5/1993 | Heule ..................................... | 408/178 |

FOREIGN PATENT DOCUMENTS 793078  10/1956  United Kingdom ................... 408/178

*Primary Examiner*—Daniel W. Howell
*Attorney, Agent, or Firm*—Lackenbach Siegel Marzullo Aronson & Greenspan, P.C.

[57] ABSTRACT

A countersinking and deburring tool for deburring, chamfering, and countersinking of partially and fully penetrating holes with a rotationally actuated housing and at least one blade which can move within a housing shaft and perpendicular to the rotational axis of the housing, provides that, depending on the direction of rotation of the drive, the blade is withdrawn into the housing shaft or extended out of the housing shaft (reverser operation), and the displacement drive for the blade consists of a rocker which is mounted so that it can rotate in the housing and is rotationally actuated, which acts on the blade with at least one actuation pin. According to the invention the rocker's rotary actuator consists of at least one centrifugal weight arranged in the housing so that it can move diametrically, whose diametric displacement in the housing is converted into a rotational motion on the rocker through a form-fit guide.

20 Claims, 4 Drawing Sheets

CENTRIFUGALLY CONTROLLED COUNTERSINKING AND DEBURRING TOOL

The invention concerns a centrifugally controlled countersinking and deburring tool according to the preamble of claim 1.

Such a countersinking and deburring tool has become known in the form of a so-called reverser tool, in which, depending on the direction of rotation, the deburring knife is either extended out of the shaft of the deburring tool, or, if the direction of rotation is changed, is withdrawn into the shaft. Here the term deburring tool is understood to mean a tool which removes burrs on hole edges without substantially changing them (<1–2 mm). The term countersinking, by contrast, is understood to involve a change in the geometry of the hole edge.

The extension and withdrawal of the blade is controlled by the rotation of the housing of the deburring tool itself, the rotary actuator and thus also the transmission of power taking place not through the tool's housing, but rather through a rod arranged and actuated in the center of it. But this has the disadvantage that the entire torque for the drive of this reverser tool must be transferred through the rod arranged in the center, which requires a relatively complicated design and also makes it necessary to choose relatively large dimensions for the components necessary to transfer the torque.

Therefore, the invention is based on the task of further developing the reverser tool known in the beginning so that it has a simple design which does away with the control of the reverser operation through a control rod and makes the structure of the reverser tool simpler and less expensive overall.

To solve the task which has been set, the invention is characterized by the technical teaching of claim 1.

An essential feature of the invention is that it proposes a so-called centrifugal control which now makes it unnecessary to provide a separate drive rod to extend and withdraw the blade. This makes the design simpler and less expensive.

Another advantage of the invention is that the reverser tool can now have a rigid housing which transfers the torque directly, which was not the case in the state of the art. This allows substantially higher torques to be transferred directly through the housing, which previously had to be transferred through a central rod. To simplify the following description, it is assumed that the deburring tool contains only a single blade which is arranged perpendicular to the axis of rotation so that it can slide in the shaft of the deburring tool. Naturally, the invention is not limited to this; the invention claims both the arrangement of a blade and the arrangement of two blades arranged against one another; more than two blades are also possible, which, for example, could be arranged in the shape of a star in the shaft of the deburring tool, each of which is driven through a rocker or several rockers so that it can slide in the shaft of the deburring tool. However, for simplicity's sake the discussion below assumes only a single blade.

The centrifugal control according to the invention provides that at least one movable centrifugal weight is arranged in the housing perpendicular to the central longitudinal axis of the housing, whose radial motion in the housing is converted into a rotational motion on the rocker, this rocker being arranged so that it aligns with the longitudinal central axis and so that it can rotate in the housing. There are several possibilities for the conversion of the radial sliding motion of the centrifugal weight into a rotational motion on the rocker. A preferred form of this invention provides a form-fit guide between the centrifugal weight and the rocker which is capable of converting the described radial sliding motion of the centrifugal weight into a corresponding rotational motion of the rocker. Here a rack-and-pinion guide is preferred.

However, other form-fit guides are also claimed, such as, for example, a pinion-toothed belt guide, or other form-fit clutches of that kind. This invention claims both the presence of a single centrifugal weight, which can move radially and (preferred) which is spring-loaded in the housing of the deburring tool, and also the arrangement of more than one centrifugal weight, especially two or several centrifugal weights, each of which is arranged so that can be guided radially in the deburring tool.

If only one radially movable and axially spring-loaded centrifugal weight is used, a corresponding mass must be used to balance the deburring tool. Such a mass balance can consist of an opposite counterweight, which for balancing purposes can also be radially arranged in the housing of the deburring tool as a mirror-image to the first-mentioned centrifugal weight, but which does not necessarily take on the rotary actuation of the rocker.

Thus, it is sufficient for the rotary actuation of the rocker to be executed as only a single centrifugal weight.

However, for simplicity's sake the discussion below will assume that two centrifugal weights are present which are arranged opposite to one another and as mirror images to the longitudinal central axis, each of which mates on a common pinion which is connected with the rocker in a rotation-resistant manner.

In this way, the deburning tool is favorably balanced and the pinion is symmetrically actuated through the racks of the respective centrifugal weights, which are arranged opposite and parallel to one another.

Here it is preferred if a corresponding return spring presses the two centrifugal weights against one another when the tool is still so that they essentially touch in the parting plane arranged in the central longitudinal axis. For example, if the deburring tool is driven clockwise now, with the rotary actuator being put directly on the housing, then centrifugal force acts on the two centrifugal weights and they are pushed radially outward from the central longitudinal axis and assume a mutual distance to one another. Simultaneously, the two racks move away from one another, and thus drive the pinion held between the two racks, and which is mounted in a rotationally resistant manner with the rocker so that it can rotate in the central longitudinal axis of the deburring tool. This rotates the rocker, and after that puts the rocker with an associated actuation pin eccentrically on the blade, so that the blade is extended out of the shaft of the deburring tool.

The engagement of the actuation pin on the blade is selected so that the blade stops in relation to the actuation pin in extended state, i.e it is self-locking in relation to its displacement force. Here the speed of the deburring tool is selected to make certain that the centrifugal weights remain pushed radially outwards in the housing and touch the wall of the housing, which thus constantly holds the rocker in its rotational position corresponding to the extended position.

It is only when the tool is operated below a certain speed that the force of the return spring, which prestresses each centrifugal weight radially inwards, comes to predominate, and it presses the respective centrifugal weight back, which rotates the rocker in the opposite direction and draws the blade back into the shaft of the deburring tool.

Therefore, in a first embodiment of the invention the extension of the blade is not made proportional to the displacement of the centrifugal weights in the housing. Rather, the blade is made to be either entirely extended or entirely withdrawn.

In a second embodiment of the invention the extension of the blade can be made proportional to the displacement of the centrifugal weights, so that the blade displacement travel can be selected as a function of the speed of the deburring tool. This makes it possible to select different deburring diameters by controlling the speed.

This invention also claims as inventive a so-called quick-change device for blades, which is intended to be inventive both considered by itself, and is intended to enjoy protection in combination with the previously mentioned features of the centrifugal actuator.

The quick-change device for the blade or blades is based on the fact that the rocker, which engages into the respective blade with its actuation pin, is mounted so that it can move axially and is spring-loaded in the housing of the deburring tool. Thus, a corresponding axial displacement of the rocker against the force of the spring which acts on the rocker can disengage the actuation pin from the associated blade, and thus the blade can, in a simple manner, be taken out of its guide recess on the shaft of the deburring tool and replaced by another blade. The form of the axial displacement mount of the rocker also functions independent of the nature of the rocker's rotary actuation. This means that here it is unimportant whether the rocker is actuated by a centrifugal actuator or by another rotary actuator, e.g. even in the manner in which it has been described in the state of the art in connection with the control rod.

Thus, this invention claims a direct and axially non-displaceable connection between the pinion and the rocker in a first embodiment, and, in a second embodiment, a twist-on connector between the pinion and the rocker which is capable of transferring rotational forces in a form-fit manner, but which associates a spring-loaded axial play in the rocker's motion.

The claimed subject matter of this invention follows not only from the subject of the individual claims, but also from the combination of the individual claims together.

All information and features disclosed in the documents, including the summary, especially the spatial form presented in the drawings, are claimed as essential to the invention, to the extent that they are new to the state of the art, either individually or in combination.

The invention is explained in detail below using drawings which present only one embodiment Other features and advantages of the invention follow from the drawings and their description.

Figure 2:
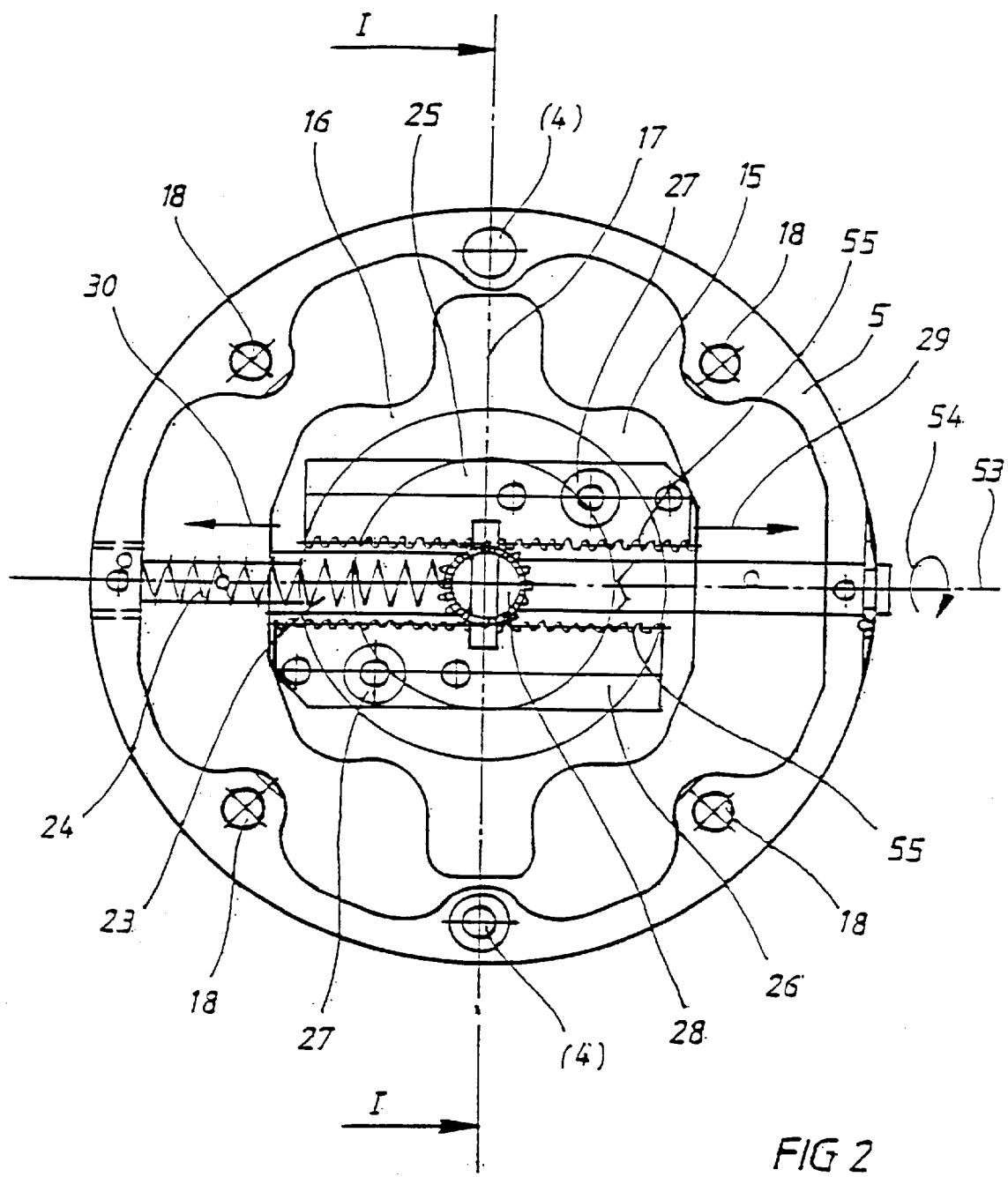
Figure 3:
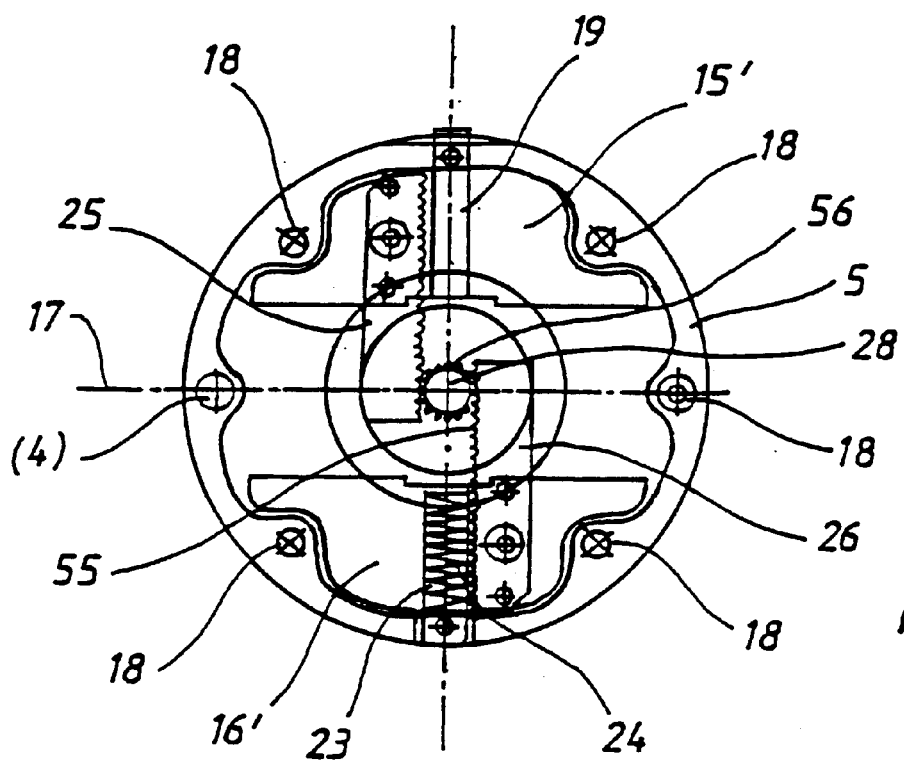
Figure 4:
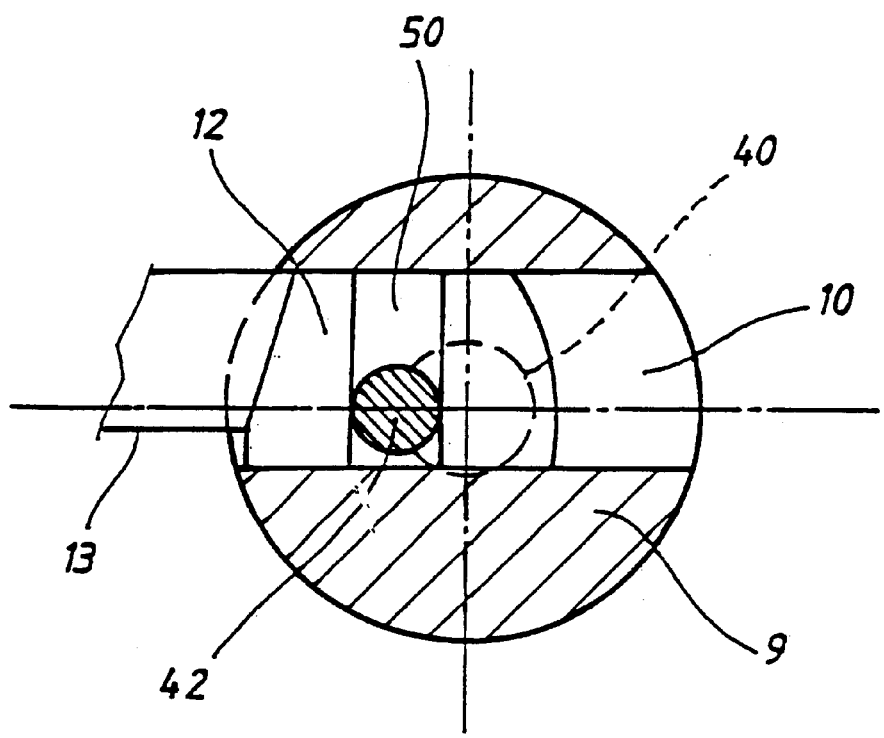
Figure 5:
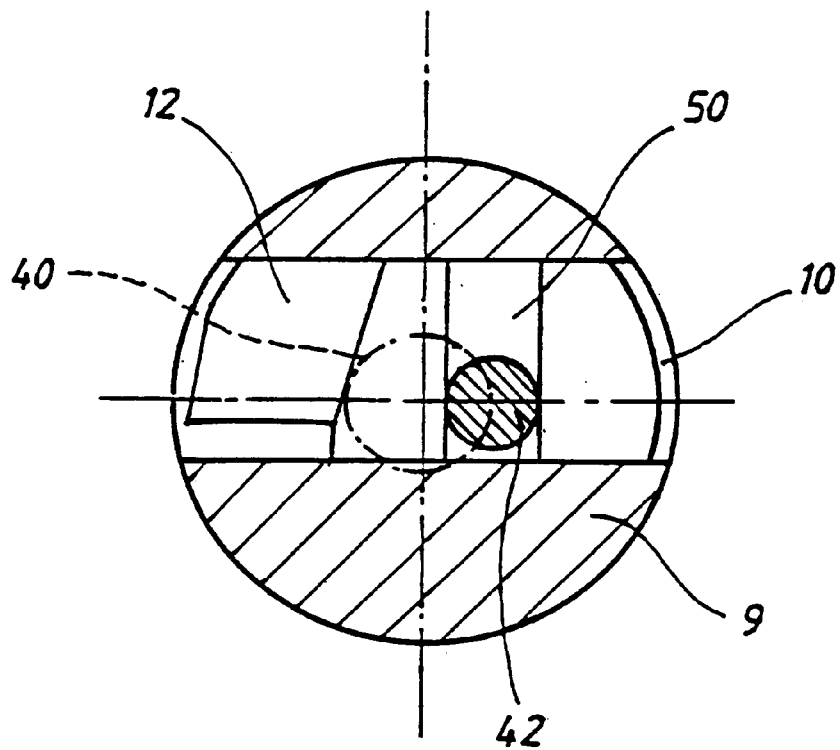
Figure 6:
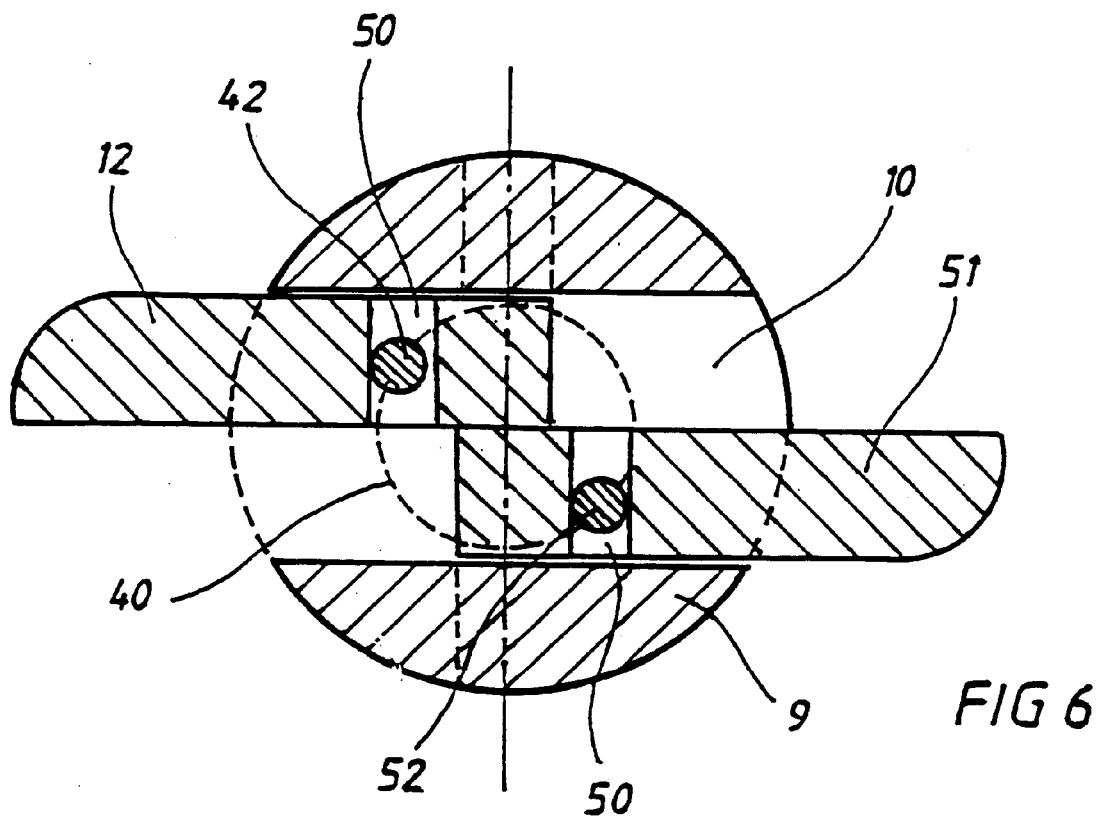

The drawings are as follows:

FIG. 1: Section through a countersinking and deburring tool according to the invention, in the direction of line I—I as shown in FIG. 2;

FIG. 2: Central cross section through the countersinking and deburring tool shown in FIG. 1;

FIG. 3: An illustration corresponding to the section in FIG. 2, with the centrifugal weights extended;

FIG. 4: A section through the blade guide in the extended state;

FIG. 5: A section according to FIG. 4, in the withdrawn state;

FIG. 6: An alternative embodiment with two blades.

A rotary actuator, which is not shown in detail, engages with shaft 2 of the deburring tool, which drives the deburring tool about rotational axis 53, for example in the direction of arrow 54.

The shaft is connected, by making it out of a single piece of material, with a housing cover 1 which is fastened to the front side of the top part of the housing 5 by means of pins 4 and screws in threaded holes 18 (not shown in detail). A coolant canal 3 passes through the shaft 2 which, as shown in FIG. 1, extends through the entire tool and discharges in a coolant outlet 14 on the front of the shaft cover 11.

The top part of the housing 5 has two centrifugal weights 15, 16 arranged in it, which are opposite one another and mirror-symmetric to the parting plane 10, and which have an approximately groove-shaped cross section, whose front sides touch in the parting plane 17 in the withdrawn state. Each centrifugal weight 15, 16 is mounted so that it can move radially on two guide bolts 19, 20 arranged at a distance to one another and parallel to one another, the top guide bolt 19 being arranged in a cylindrical hole 21, while the lower guide bolt 20 is arranged with play in an approximately slot-shaped play recess 22 to ensure that it is easy for the centrifugal weights 15, 16 to move radially on these two guide bolts 19, 20.

As shown in FIG. 3, each centrifugal weight is connected by associated screws with one rack 25, 26, each rack 25, 26 having an inwardly-directed toothing 55, and both toothings being arranged parallel and at a mutual distance to one another in such a way that a pinion 28 is held between them whose outside toothing mates with the respective toothing 55 of the racks 25, 26.

Each centrifugal weight 15, 16 also has one or several recess(es) 23 arranged in it, approximately in its center, which are made as blind holes and into which one or several return springs 24 engage, whose opposite ends rest on the inside wall of the top part of the housing 5.

The screws which connect the racks with the centrifugal weights are indicated here with the number 27.

Centrifugal weight 15 is associated with rack 25, while centrifugal weight 16 is associated with rack 26. As shown in FIG. 3, the front free end of each rack projects onto the centrifugal weight lying opposite it, and there each dips into a groove 57, so that in the withdrawn state the two centrifugal weights can touch with their front sides turned toward one another, in the area of the parting plane 17.

The top part of the housing 5 is connected by means of pins 6 with a bearing housing 7 which holds the pinion 28 mounted there so that it can rotate, which is mounted so that it can rotate in a pivot bearing 31 in this bearing housing 7.

The pins 6 and screws (not shown in detail) connect the bearing housing 7 with an attached blade housing 8 which holds the pivot bearing and the axial sliding bearing for the rocker 36. The blade housing 8 is connected, by being made out of a single piece of material, with the housing shaft 9, which has a smaller diameter than the blade housing 8 and is closed toward the front by a shaft cover 11. This housing shaft 9 has a transverse recess 10 going through it, which has a blade 12 arranged in it so that it can move in the direction of arrows 43.

Here the blade 12 has one or several cutting edges 13, which are suitable for applying to a corresponding hole edge and to deburr or create the hole edge of a through hole's countersink or the hole edge of a countersink itself, both from the front side and from the back side.

Here the displacement of the blade 12 is actuated through the rotation of the rocker 36, which preferably is connected with the rocker shaft 40 by being made out of the same piece of material, which in turn is preferably connected with a bearing box of greater diameter by being made out of the same piece of material, so that this bearing box 41, as a friction bearing, acts as a pivot bearing for the rocker 36 in the housing shaft 9, while the top end of the rocker 36 is held in an axial bearing 35, so that the rocker 36 is thus mounted so that it can rotate in relation to the housing shaft 9 on the bearings 35, 41.

Now if the separately claimed quick-change device were not present, then the rocker 36 would be connected directly with the pinion, and in such a way that it could not slide. This consists of its own pinion 28, which is connected, by being made out of the same piece of material, with a pinion body 32, which—as has been described—is held in the pivot bearing 31. Rotation of the pinion 28, for example in the direction of arrow 54 about rotational axis 53, then directly produces an equal rotation of the rocker 36, which thus twists the actuation pin 42, which engages in a recess 50 in the blade 12 and then pushes the latter radially out of the recess 10 in the housing 9, for example in the direction of arrow 43.

Now the rotary actuation takes place in such a way that, as shown in FIG. 3, for a tool driven counterclockwise or clockwise, as the speed increases the centrifugal weights 15, 16 move radially outward in their position 15', 16' and press against the inside wall of the top part of the housing 15, the two opposite racks 25, 26 simultaneously rotating the pinion 28 clockwise. This also rotates the rocker through the twist-on connector consisting of pins 33, 34, and the blade is pushed out of the housing shaft 9 in the direction of arrow 43.

As shown in FIG. 3, the radial outward displacement of the centrifugal weights 15, 16 simultaneously prestresses the respective return spring 24. As soon as the speed of the rotary actuator falls below a certain value, along with it the return force of the respective return spring 24 becomes greater than the centrifugal force, which acts on the centrifugal weights 15, 16 in the opposite direction, so that the centrifugal weights go back in again out of their extended position, opposite to the direction of arrows 29,30, as shown in FIG. 3.

We will now describe the blade quick-change device in detail. It is essentially based on the fact that the rocker 36 together with its rocker shaft 40 is guided so that it is spring loaded and can move in an axial direction in the housing. For this purpose, the rocker 36 and the opposite pinion body 32 have recesses 37, 38 which align with one another and which have a return spring 39 arranged in them; they rest on the base of the respective recess.

Thus, the rocker shaft 40 is pre-stressed under spring load, so that the actuation pin 42, under the force of the return spring 39, engages into the associated recess 50 on the blade 12.

The front side of the blade housing 8 has a pressure plate 44 arranged on it which can move in an axial direction (in the direction of arrow 49 and in the opposite direction) and which is connected with actuation pins 46 pointing in the axial direction, which in turn rest on an actuation plate 47 lying inside. The actuation plate 47 carries the axial bearing 35, which thus can move in an axial direction together as a unit with the rocker 36. Thus, quick-changing of the blade involves exerting a force in the direction of arrow 49 on the pressure plate 44, which thus rises from its stop ring 45 and moves the actuation plate 47 and along with it the ball bearing 35 in FIG. 1 to the right. This also moves the rocker 36, 40 to the right, and the actuation pin 42 ends up disengaged from the recess 50 in blade 12, so that the latter falls out of the recess 10 in the direction of arrow 43. Now another blade can easily be inserted, after which the pressure plate 44 is unloaded and then the actuation pin 42 again engages into the recess 50 of the blade 12.

Pins 33 and 34, which serve as a twist-on connector between the pinion body 32 and the rocker 36 are selected with different diameters to prevent confusing them. On one side they are solidly clamped into the pinion body 32, and have a corresponding latitude in their motion in connection with the clearance 48 with the associated slot in the rocker 36.

FIGS. 4 and 5 show a section through the bottom part of the rocker shaft at the height of recess 10 for the transversely mounted and radially movable blade 12. It can be seen that the actuation pin 42 is fastened on the front of the rocker shaft 40 eccentric to the rotational axis of the rocker 36, and engages in a slit-shaped recess 50 in the blade 12. The rotation of the rocker shaft 40 about the rotational axis 53 thus twists the actuation pin 42 into the pivot bearing shown in FIGS. 4 and 5, and thus the blade 12 is moved out of its extended position as shown in FIG. 3 into its withdrawn position as shown in FIG. 5.

The extended position of the blade 12 as shown in FIG. 4 is stable, since the actuation pin 42 is fixed in the recess 50 in such a way that a radial, inwardly directed force on the cutting edge 13 acts directly on the center point of the actuation pin 42, which lies stably in 9-o'clock position in front of the rocker shaft, and thus this force acts directly on the center of the rocker shaft 40 without twisting it.

FIG. 6 shows another variant in which a rocker with a rocker shaft 40 and two diametrically opposite actuation pins 42, 52, each of which is associated with a blade 12, 51.

Thus, rotation of the rocker synchronously extends or withdraws both blades. The blade quick-changing device can also be used in this embodiment, since when the rocker is axially displaced, both actuation pins 42, 52 disengage from the blades 12, 51.

| Legend for Drawings | |
|---|---|
| 1 Housing cover | 36 Rocker |
| 2 Shaft | 37 Recess |
| 3 Coolant canal | 38 Recess |
| 4 Pin | 39 Return spring |
| 5 Top part of housing | 40 Rocker shaft |
| 6 Pin | 41 Bearing box |
| 7 Bearing housing | 42 Actuation pin |
| 8 Blade housing | 43 Arrow direction |
| 9 Housing shaft | 44 Pressure plate |
| 10 Recess | 45 Stop ring |
| 11 Shaft cover | 46 Actuation pin |
| 12 Blade | 47 Actuation pin |
| 13 Cutting edge | 48 Clearance |
| 14 Coolant outlet | 49 Arrow direction |
| 15 Centrifugal weight | 50 Recess |
| 16 Centrifugal weight | 51 Blade |
| 17 Parting plane | 52 Actuation pin |
| 18 Threaded hole | 53 Rotational axis |
| 19 Guide bolt | 54 Arrow direction |
| 20 Guide bolt | 55 Toothing |
| 21 Hole | 56 External toothing |
| 22 Play recess | 57 Groove |
| 23 Recess for return spring | |
| 24 Return spring | |
| 25 Rack | |
| 26 Rack | |
| 27 Screw | |
| 28 Pinion | |
| 29 Arrow direction | |
| 30 Arrow direction | |
| 31 Pivot bearing | |
| 32 Pinion body | |
| 33 Pin | |
| 34 Pin | |
| 35 Ball bearing | |

We claim:

1. Countersinking and deburring tool for deburring, chamfering, and countersinking of counter sunk and through holes with a rotationally actuated housing (1, 2, 7, 8, 9) and at least one blade (12) which can move within a housing shaft (9) and perpendicular to the rotational axis of the housing, the blade being withdrawn into the housing shaft (9) when the tool is stationary or rotating slowing, and being extended out of the housing shaft at a specific high speed, and the displacement drive for the blade (12) consisting of a rocker (36) which is mounted so that it can rotate in the housing and is rotationally actuated, which acts on the blade (12) with at least one actuation pin (42), characterized by the fact that the rotary actuation of the rocker (36) consists of at least one centrifugal weight (15, 16) arranged in the housing so that it can move diametrically, whose diametrical displacement in the housing is converted into a rotational motion on the rocker (36) through a form-fit guide.

2. Countersinking and deburring tool according to claim 1, characterized by the fact that two centrifugal weights (15, 16), which are mirror images of one another relative to a central parting plane (17), are each arranged in the housing so that they can move diametrically.

3. Countersinking and deburring tool according to claim 2, characterized by the fact that each centrifugal weight (15, 16) is connected with at least one rack (25, 26), and both racks mate with a pinion (28), which is connected with the rocker (36) so that it is resistant to rotation.

4. Countersinking and deburring tool according to claim 3, characterized by the fact that a connector which transfers the torsional force but can be moved axially is arranged between the pinion and the rocker.

5. Countersinking and deburring tool for deburring, chamfering, and countersinking of counter sunk and through holes with a rotationally actuated housing (1, 2, 7, 8, 9) and at least one blade (12) which can move within a housing shaft (9) and perpendicular to the rotational axis of the housing, the blade being withdrawn into the housing shaft (9) when the tool is stationary or rotating slowing, and being extended out of the housing shaft at a specific high speed, and the displacement drive for the blade (12) consisting of a rocker (36) which is mounted so that it can rotate in the housing and is rotationally actuated, which acts on the blade (12) with at least one actuation pin (42), characterized by the fact that to allow quick changing of the blade or blades (12) the rocker (8, 40, 41) is mounted so that it can move axially in the housing and that thus the actuation pin (42) of the rocker (8, 40, 41) can be disengaged from the recess (50) in the blade (12).

6. Countersinking and deburring tool according to claim 5, characterized by the fact that the front side of the blade housing (8) has a pressure plate (44) arranged on it which can move axially to the rotational axis of the tool and which displaces the rocker (36) through at least one axially directed actuation pin (46) against the force of a return spring (39) in the blade housing (8).

7. Countersinking and deburring tool according to claim 5, characterized by the fact that a connector which transfers the torsional force but can be moved axially is arranged between the pinion and the rocker.

8. Countersinking and deburring tool according to claim 2, characterized by the fact that a connector which transfers the torsional force but can be moved axially is arranged between the pinion and the rocker.

9. Countersinking and deburring tool according to claim 2, characterized by the fact that each centrifuigal weight is arranged so that it can move on guide bolts arranged perpendicular to the longitudinal central plane of the housing and so that it is spring-loaded against the housing wall.

10. Countersinking and deburring tool according to claim 3, characterized by the fact that each centrifugal weight is arranged so that it can move on guide bolts arranged perpendicular to the longitudinal central plane of the housing and so that it is spring-loaded against the housing wall.

11. Countersinking and deburring tool according to claim 1, characterized by the fact that two blades are present which are arranged parallel to one another and next to one another, each of which is actuated by an actuation pin of the rocker so that they can be moved against one another.

12. Countersinking and deburring tool according to claim 2, characterized by the fact that two blades are present which are arranged parallel to one another and next to one another, each of which is actuated by an actuation pin of the rocker so that they can be moved against one another.

13. Countersinking and deburring tool according to claim 3, characterized by the fact that two blades are present which are arranged parallel to one another and next to one another, each of which is actuated by an actuation pin of the rocker so that they can be moved against one another.

14. Countersinking and deburring tool according to claim 9, characterized by the fact that two blades are present which are arranged parallel to one another and next to one another, each of which is actuated by an actuation pin of the rocker so that they can be moved against one another.

15. Countersinking and deburring tool according to claim 10, characterized by the fact that two blades are present which are arranged parallel to one another and next to one another, each of which is actuated by an actuation pin of the rocker so that they can be moved against one another.

16. Countersinking and deburring tool according to claim 5, characterized by the fact that two blades are present which are arranged parallel to one another and next to one another, each of which is actuated by an actuation pin of the rocker so that they can be moved against one another.

17. Countersinking and deburring tool according to claim 6, characterized by the fact that two blades are present which are arranged parallel to one another and next to one another, each of which is actuated by an actuation pin of the rocker so that they can be moved against one another.

18. Countersinking and deburring tool according to claim 1, characterized by the fact that a connector which transfers the torsional force but can be moved axially is arranged between the pinion and the rocker.

19. Countersinking and deburring tool according to claim 9, characterized by the fact that a connector which transfers the torsional force but can be moved axially is arranged between the pinion and the rocker.

20. Countersinking and deburring tool according to claim 10, characterized by the fact that a connector which transfers the torsional force but can be moved axially is arranged between the pinion and the rocker.

* * * * *